US011310004B2

(12) United States Patent
Paladugu et al.

(10) Patent No.: US 11,310,004 B2
(45) Date of Patent: Apr. 19, 2022

(54) MASTER NODE TRANSPORT NETWORK LAYER INFORMATION EXCHANGE FOR DOWNLINK DATA FORWARDING OF A SECONDARY NODE TERMINATED BEARER

(71) Applicant: QUALCOMM Incorporated, San Diego, CA (US)

(72) Inventors: Karthika Paladugu, San Diego, CA (US); Xipeng Zhu, San Diego, CA (US); Gavin Bernard Horn, La Jolla, CA (US); Luis Fernando Brisson Lopes, Swindon (GB)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 16/544,619

(22) Filed: Aug. 19, 2019

(65) Prior Publication Data
US 2020/0059333 A1 Feb. 20, 2020

Related U.S. Application Data

(60) Provisional application No. 62/764,989, filed on Aug. 20, 2018.

(51) Int. Cl.
*H04W 76/22* (2018.01)
*H04L 5/00* (2006.01)

(52) U.S. Cl.
CPC .......... *H04L 5/0032* (2013.01); *H04L 5/0055* (2013.01)

(58) Field of Classification Search
CPC ..... H04L 5/0032; H04L 5/001; H04L 5/0055; H04W 76/16; H04W 76/22; H04W 28/085; H04W 76/11; H04W 76/15; H04W 88/06

(Continued)

(56) References Cited

U.S. PATENT DOCUMENTS

2010/0034169 A1* 2/2010 Maheshwari ........... H04L 47/34
370/331
2018/0049214 A1* 2/2018 Kubota ............. H04W 72/1215
(Continued)

OTHER PUBLICATIONS

Samsung: "(TP for NR BL CR for TS 38.423): DC establishment for PDCP Termination at SN", 3GPP Draft; R3-183698, 3rd Generation Partnership Project (3GPP), Mobile Competence Centre; 650, Route Des Lucioles; F-06921 Sophia-Antipolis Cedex; France (Year: 2018).*

(Continued)

*Primary Examiner* — Edan Orgad
*Assistant Examiner* — Vanneilian Lalchinthang
(74) *Attorney, Agent, or Firm* — Harrity & Harrity LLP

(57) ABSTRACT

Various aspects of the present disclosure generally relate to wireless communication. In some aspects, a master node (MN) may receive an acknowledgment message from a secondary node (SN). The MN and the SN may provide dual connectivity with a core network for a user equipment. The MN may provide an address indication message to the SN. The address indication message may include MN downlink transport network layer (TNL) information for an SN terminated data radio bearer (DRB) that requires master cell group (MCG) resources. The address indication message may be provided in a first message that immediately follows the acknowledgment message. In some aspects, the SN may receive the address indication message, and may forward, based at least in part on the MN downlink TNL information, downlink data for the SN terminated DRB that requires MCG resources. Numerous other aspects are provided.

30 Claims, 10 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2018/0278357 A1* | 9/2018 | Kim ..................... | H04J 11/0076 |
| 2018/0368204 A1* | 12/2018 | Park ........................ | H04L 41/06 |
| 2019/0166526 A1* | 5/2019 | Xu ..................... | H04W 72/0453 |
| 2019/0289470 A1* | 9/2019 | Vaidya ................. | H04W 16/14 |
| 2020/0053815 A1* | 2/2020 | Teyeb .................. | H04W 76/16 |
| 2020/0260325 A1* | 8/2020 | Futaki .................. | H04W 76/22 |
| 2020/0296637 A1* | 9/2020 | Teyeb .................... | H04L 5/001 |

OTHER PUBLICATIONS

International Search Report and Written Opinion—PCT/US2019/047269—ISA/EPO—dated Nov. 8, 2019.
Samsung: "DC Establishment for PDCP Termination at SN", 3GPP TSG-RAN WG3 #99bis, 3GPP Draft; R3-181857, 3rd Generation Partnership Project (3GPP), Mobile Competence Centre, 650, Route Des Lucioles, F-06921 Sophia-Antipolis Cedex, France, vol. RAN WG3, No. Sanya, China; Apr. 16-20, 2018, Apr. 6, 2018 (Apr. 6, 2018), 4 Pages, XP051416761, Retrieved from the Internet: URL: http://www.3gpp.org/ftp/tsg%5Fran/WG3%5Flu/TSGR3%5F99bis/Docs/ [retrieved on Apr. 6, 2018] p. 1-p. 3.
"Data forwarding aspects for DC bearer type change and QoS flow offloading", 3GPP TSG-RAN WG3 Meeting #101, Gothenborg, Sweden, Aug. 20-24, 2018, 3 pages.
"(TP for NR BL CR for TS 38.423): DC establishment for PDCP Termination at SN", 3GPP TSG-RAN WG3 NR AdHoc 1807, Montreal, Canada, Jul. 2-6, 2018, 12 pages.

* cited by examiner

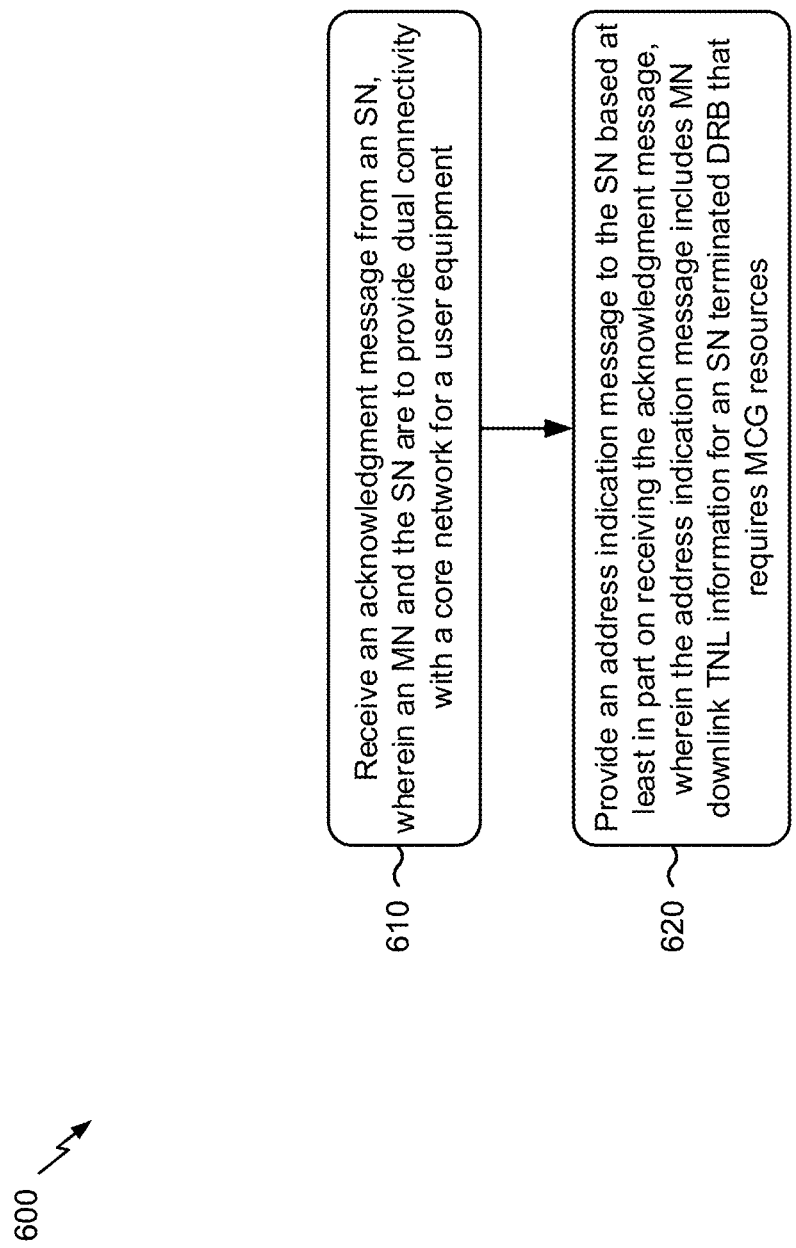

MASTER NODE TRANSPORT NETWORK LAYER INFORMATION EXCHANGE FOR DOWNLINK DATA FORWARDING OF A SECONDARY NODE TERMINATED BEARER

CROSS REFERENCE TO RELATED APPLICATION UNDER 35 U.S.C. § 119

This application claims priority to U.S. Provisional Application No. 62/764,989, filed on Aug. 20, 2018, entitled "MASTER NODE TRANSPORT NETWORK LAYER INFORMATION EXCHANGE FOR DOWNLINK DATA FORWARDING OF A SECONDARY NODE TERMINATED BEARER," which is hereby expressly incorporated by reference herein.

FIELD OF THE DISCLOSURE

Aspects of the present disclosure generally relate to wireless communication, and to master node (MN) transport network layer (TNL) information exchange for downlink data forwarding of a secondary node (SN) terminated bearer.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a master node (MN), may include receiving an acknowledgment message from a secondary node (SN), wherein the MN and the SN are to provide dual connectivity with a core network for a user equipment; and providing an address indication message to the SN based at least in part on receiving the acknowledgment message, wherein the address indication message includes MN downlink transport network layer (TNL) information for an SN terminated data radio bearer (DRB) that requires master cell group (MCG) resources.

In some aspects, a master node (MN) for wireless communication may include memory and one or more processors operatively coupled to the memory. The memory and the one or more processors may be configured to receive an acknowledgment message from a secondary node (SN), wherein the MN and the SN are to provide dual connectivity with a core network for a user equipment; and provide an address indication message to the SN based at least in part on receiving the acknowledgment message, wherein the address indication message includes MN downlink transport network layer (TNL) information for an SN terminated data radio bearer (DRB) that requires master cell group (MCG) resources.

In some aspects, a non-transitory computer-readable medium may store one or more instructions for wireless communication. The one or more instructions, when executed by one or more processors of a master node (MN), may cause the one or more processors to receive an acknowledgment message from a secondary node (SN), wherein the MN and the SN are to provide dual connectivity with a core network for a user equipment; and provide an address indication message to the SN based at least in part on receiving the acknowledgment message, wherein the address indication message includes MN downlink transport network layer (TNL) information for an SN terminated data radio bearer (DRB) that requires master cell group (MCG) resources.

In some aspects, an apparatus for wireless communication may include means for receiving an acknowledgment message from a secondary node (SN), wherein the apparatus and the SN are to provide dual connectivity with a core network for a user equipment; and means for providing an address indication message to the SN based at least in part on receiving the acknowledgment message, wherein the address indication message includes MN downlink transport network layer (TNL) information for an SN terminated data radio bearer (DRB) that requires master cell group (MCG) resources.

In some aspects, a method of wireless communication, performed by a secondary node (SN), may include receiving an address indication message from a master node (MN), wherein the SN and the MN are to provide dual connectivity with a core network for a user equipment, wherein the address indication message includes MN downlink transport network layer (TNL) information for an SN terminated data radio bearer (DRB) that requires master cell group (MCG) resources; and forwarding, based at least in part on the MN downlink TNL information, downlink data for the SN terminated DRB that requires MCG resources.

In some aspects, a secondary node (SN) for wireless communication may include memory and one or more processors operatively coupled to the memory. The memory and the one or more processors may be configured to receive an address indication message from a master node (MN), wherein the SN and the MN are to provide dual connectivity with a core network for a user equipment, wherein the address indication message includes MN downlink transport network layer (TNL) information for an SN terminated data radio bearer (DRB) that requires master cell group (MCG) resources; and forward, based at least in part on the MN downlink TNL information, downlink data for the SN terminated DRB that requires MCG resources.

In some aspects, a non-transitory computer-readable medium may store one or more instructions for wireless communication. The one or more instructions, when executed by one or more processors of a secondary node (SN), may cause the one or more processors to receive an address indication message from a master node (MN), wherein the SN and the MN are to provide dual connectivity with a core network for a user equipment, wherein the address indication message includes MN downlink transport network layer (TNL) information for an SN terminated data radio bearer (DRB) that requires master cell group (MCG) resources; and forward, based at least in part on the MN downlink TNL information, downlink data for the SN terminated DRB that requires MCG resources.

In some aspects, an apparatus for wireless communication may include means for receiving an address indication message from a master node (MN), wherein the apparatus and the MN are to provide dual connectivity with a core network for a user equipment, wherein the address indication message includes MN downlink transport network layer (TNL) information for an SN terminated data radio bearer (DRB) that requires master cell group (MCG) resources; and means for forwarding, based at least in part on the MN downlink TNL information, downlink data for the SN terminated DRB that requires MCG resources.

Aspects generally include a method, apparatus, system, computer program product, non-transitory computer-readable medium, user equipment, base station, master node, secondary node, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a master node, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
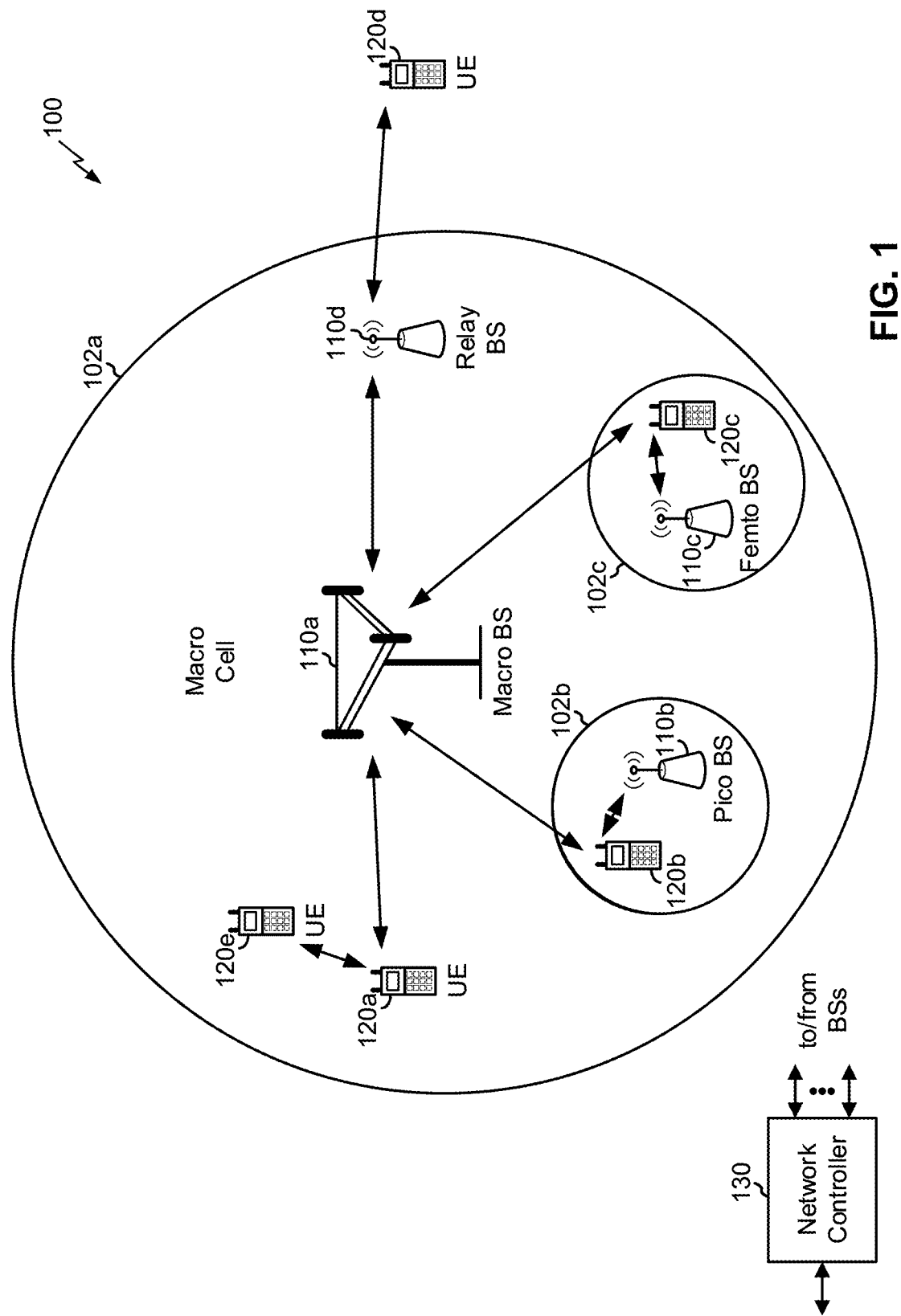
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of B Ss 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
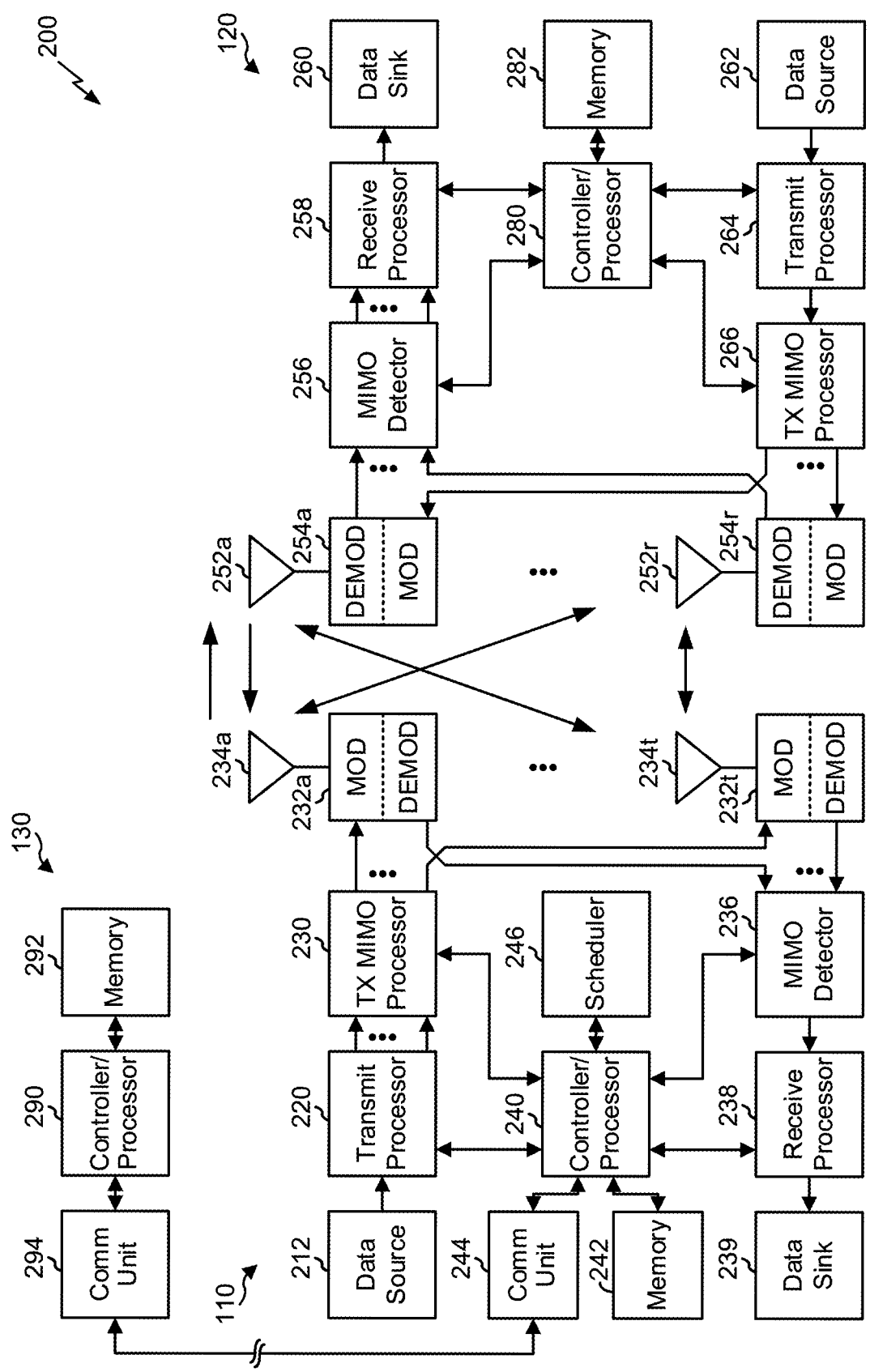
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with master node (MN) transport network layer (TNL) information exchange for downlink data forwarding of a secondary node (SN) terminated bearer, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, a master node (MN) (e.g., a first base station 110) may include means for receiving an acknowledgment message from a secondary node (SN) (e.g., a second base station 110), wherein the MN and the SN are to provide dual connectivity with a core network for a user equipment; means for providing an address indication message to the SN based at least in part on receiving the acknowledgment message, wherein the address indication message includes MN downlink transport network layer (TNL) information for an SN terminated data radio bearer (DRB) that requires master cell group (MCG) resources; and/or the like. In some aspects, such means may include one or more components of base station 110 described in connection with FIG. 2.

In some aspects, a secondary node (SN) (e.g., a first base station 110) may include means for receiving an address indication message from a master node (MN) (e.g., a second base station 110), wherein the SN and the MN are to provide dual connectivity with a core network for a user equipment (e.g., UE 120) wherein the address indication message includes MN downlink transport network layer (TNL) information for an SN terminated data radio bearer (DRB) that requires master cell group (MCG) resources; means for forwarding, based at least in part on the MN downlink TNL information, downlink data for the SN terminated DRB that requires MCG resources; and/or the like. In some aspects, such means may include one or more components of base station 110 described in connection with FIG. 2.

As indicated above, FIG. 2 is provided merely as an example. Other examples may differ from what is described with regard to FIG. 2.

Figure 3:
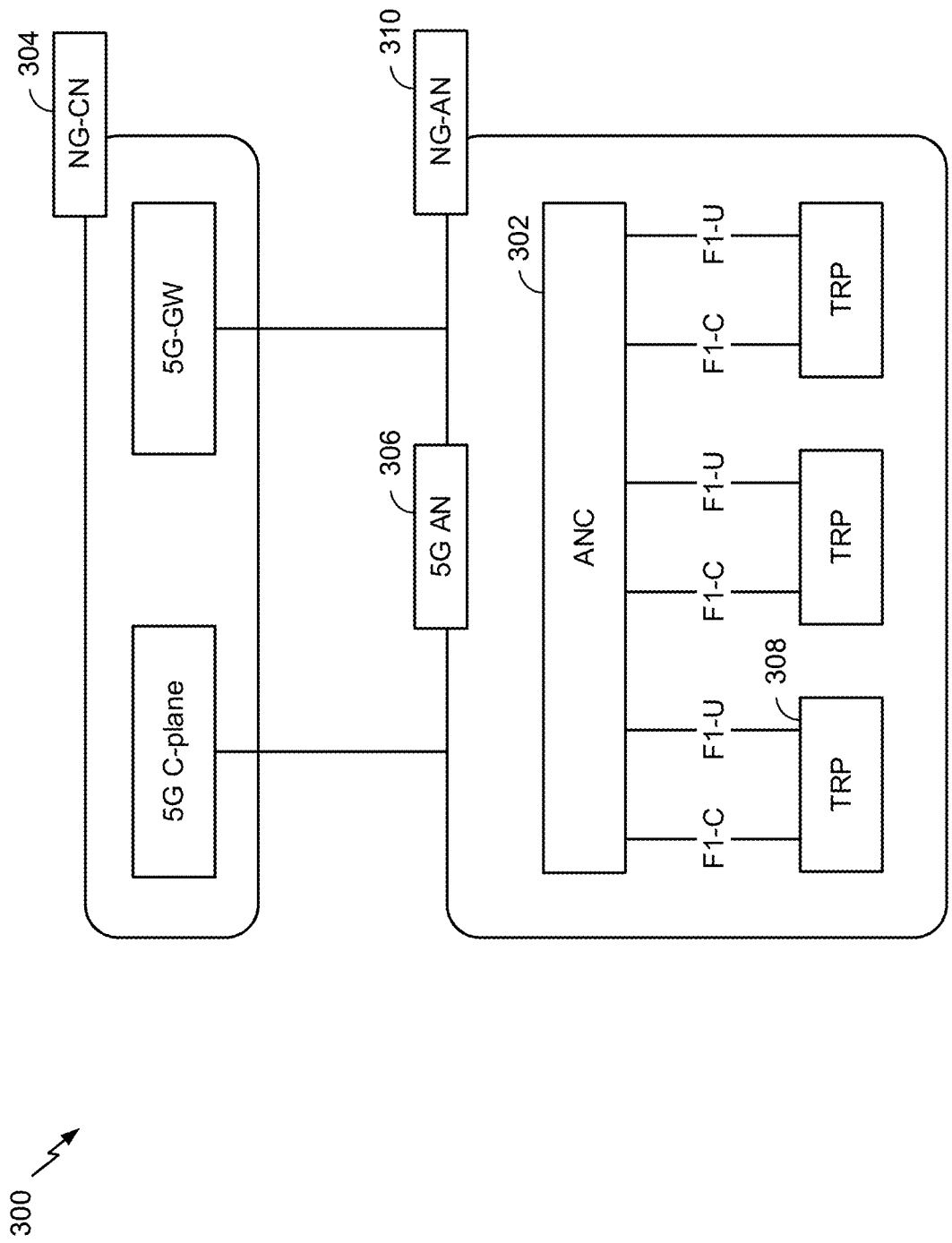
FIG. 3 illustrates an example logical architecture of a distributed radio access network (RAN), in accordance with various aspects of the present disclosure.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, gNB, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 300 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of RAN 300. The packet data convergence protocol (PDCP), radio link control (RLC), media access control (MAC) protocol may be adaptably placed at the ANC or TRP.

According to various aspects, a BS may include a central unit (CU) (e.g., ANC 302) and/or one or more distributed units (e.g., one or more TRPs 308).

As indicated above, FIG. 3 is provided merely as an example. Other examples may differ from what is described with regard to FIG. 3.

Figure 4:
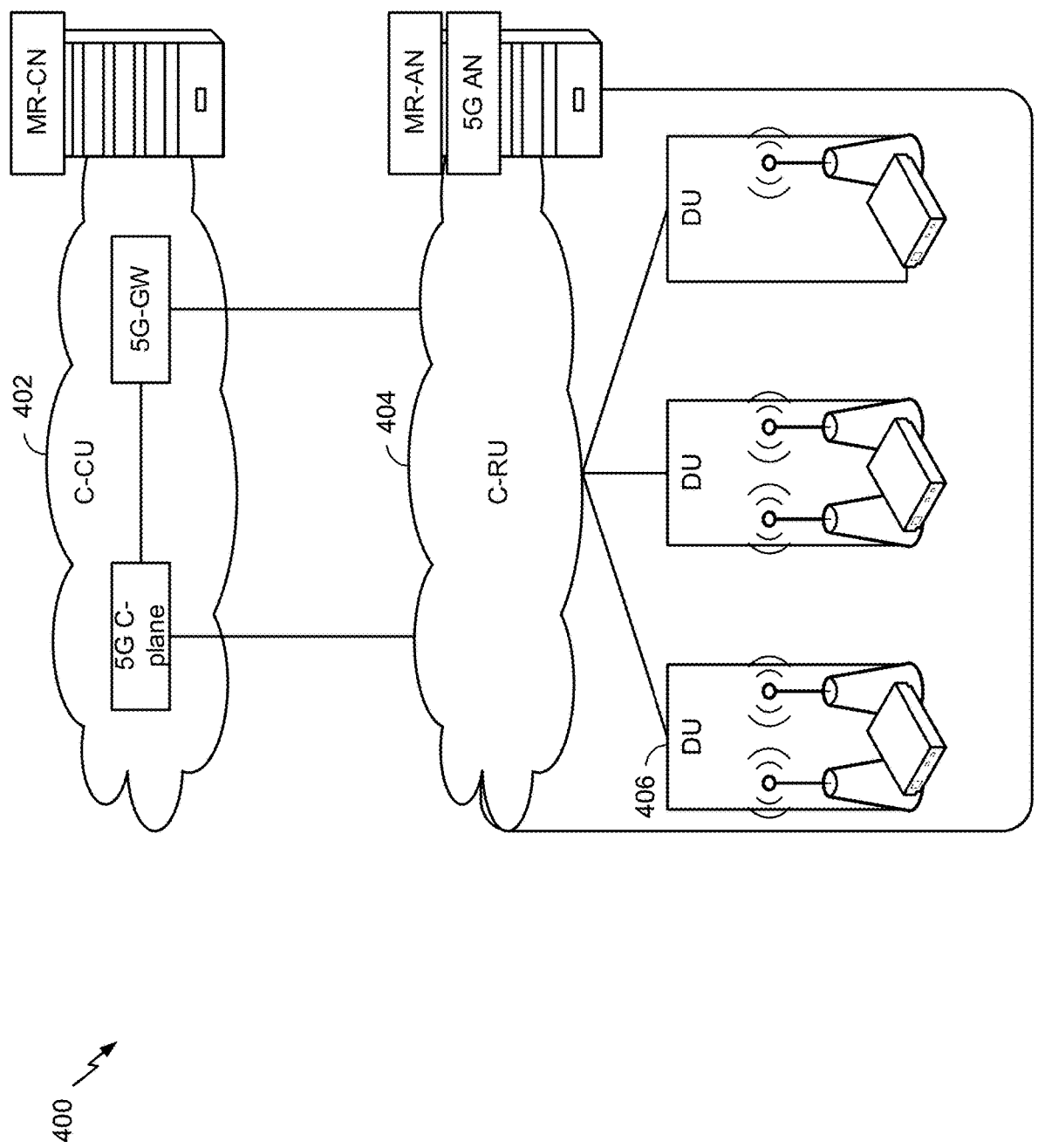
FIG. 4 illustrates an example physical architecture of a distributed RAN, in accordance with various aspects of the present disclosure.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity.

A centralized RAN unit (C-RU) 404 may host one or more ANC functions. Optionally, the C-RU may host core network functions locally. The C-RU may have distributed deployment. The C-RU may be closer to the network edge.

A distributed unit (DU) 406 may host one or more TRPs. The DU may be located at edges of the network with radio frequency (RF) functionality.

As indicated above, FIG. 4 is provided merely as an example. Other examples may differ from what is described with regard to FIG. 4.

In the case of dual connectivity (DC) with a 5G core network (5GC) (e.g., multi-RAT DC (MR-DC), NR-NR DC, and/or the like) quality of service (QoS) flows belonging to the same protocol data unit (PDU) session may be mapped to different bearer types. That is, a master node (MN) (e.g., a first base station 110) may request the 5G core network to direct user plane traffic of one or more QoS flows of the PDU session (e.g., all of the QoS flows, a subset of the QoS flows) either to the MN or to a secondary node (SN) (e.g., a second base station 110). When one or more QoS flows for the PDU session are offloaded by the MN to the SN, there is a service data adaptation protocol (SDAP) entity configured on the SN (in addition to the SDAP entity configured on the MN) for the PDU session.

The node (e.g., the MN or the SN) that hosts the SDAP entity for a given QoS flow decides how to map the QoS flow to data radio bearers (DRBs). Thus, for the QoS flows offloaded to the SN (i.e., for SN terminated bearers), the SN decides a mapping for the offloaded QoS flows to DRBs, which may be different than the MN mapping for the QoS flows to DRBs prior to offloading. Further, the SN decides whether a given QoS flow will be configured to use a master cell group (MCG) bearer, a secondary cell group (SCG) bearer, or a split bearer.

During, the SN addition procedure (e.g., an MN-initiated procedure associated with adding an SN in order to provide a UE dual connectivity with the 5G core network), the SN informs the MN (e.g., in an SN addition request acknowledgment message) regarding the modified QoS flow to DRB mapping. The SN also notifies the MN regarding a need for MCG resources for the DRBs that have been configured as split bearers or MCG bearers.

Here, if the SN configures an SN terminated bearer as a split bearer or an MCG bearer, downlink data forwarded from the MN to the SN for lossless data transfer and downlink data received from the 5G core network for these QoS flows have to be forwarded by the SN to the MN in order to be sent using the MCG resources. In order to enable this data forwarding, the SN must know MN downlink Transport Network Layer (TNL) information for each SN terminated DRB requiring MCG resources. However, since the MN does not know the QoS flow to DRB mapping information upon initiation of the SN addition procedure, it is not possible for the MN to send the MN downlink TNL information at that time. Without the MN downlink TNL information for the SN terminated DRBs that require MCG resources, neither lossless data transfer or forwarding of downlink data from the 5G core network can be performed.

Some aspects described herein provide MN TNL information exchange for downlink data forwarding of an SN terminated bearer for dual connectivity with a 5G core network scenario. In some aspects, the MN may provide an address indication message to the SN based at least in part on receiving an acknowledgment message. The address indication message may include the MN downlink TNL information for one or more SN terminated DRBs that require MCG resources. In some aspects, the MN may provide the address indication message immediately after the MN receives the acknowledgment message (e.g., in a first message that immediately follows the acknowledgment message). Additional details are described below.

In some aspects, the SN may receive the address indication message including the MN downlink TNL information, and may forward, based at least in part on the MN downlink TNL information, downlink data for an SN terminated DRB that requires MCG resources. In some aspects, the address indication message is received in a first message that immediately follows the acknowledgment message being provided. Additional details are described below.

Additionally, in the case of an MN initiated SN modification procedure (e.g., an MN-initiated procedure associated with modifying an SN in association with providing a UE dual connectivity with the 5G core network), the MN may offload or modify QoS flows to the SN. As such, the techniques described herein are applicable to the MN initiated SN modification procedure (in addition to being applicable to the MN initiated SN addition procedure).

FIGS. 5A-5D are diagrams illustrating examples of master node (MN) transport network layer (TNL) information exchange for downlink data forwarding of a secondary node (SN) terminated bearer, in accordance with various aspects of the present disclosure.

Figure 5A:
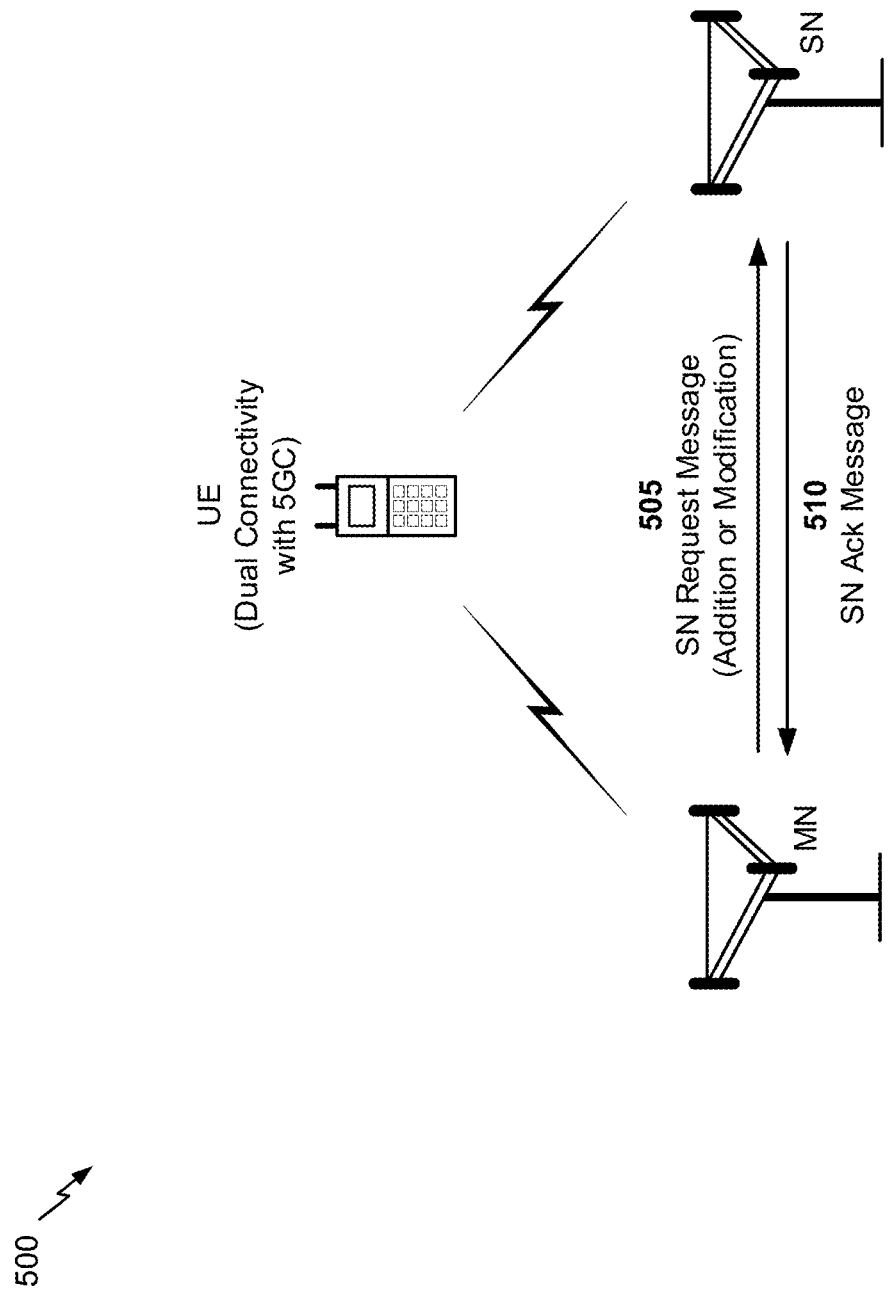
FIGS. 5A-5D are diagrams illustrating examples of master node (MN) transport network layer (TNL) information exchange for downlink data forwarding of a secondary node (SN) terminated bearer, in accordance with various aspects of the present disclosure.
Figure 5B:
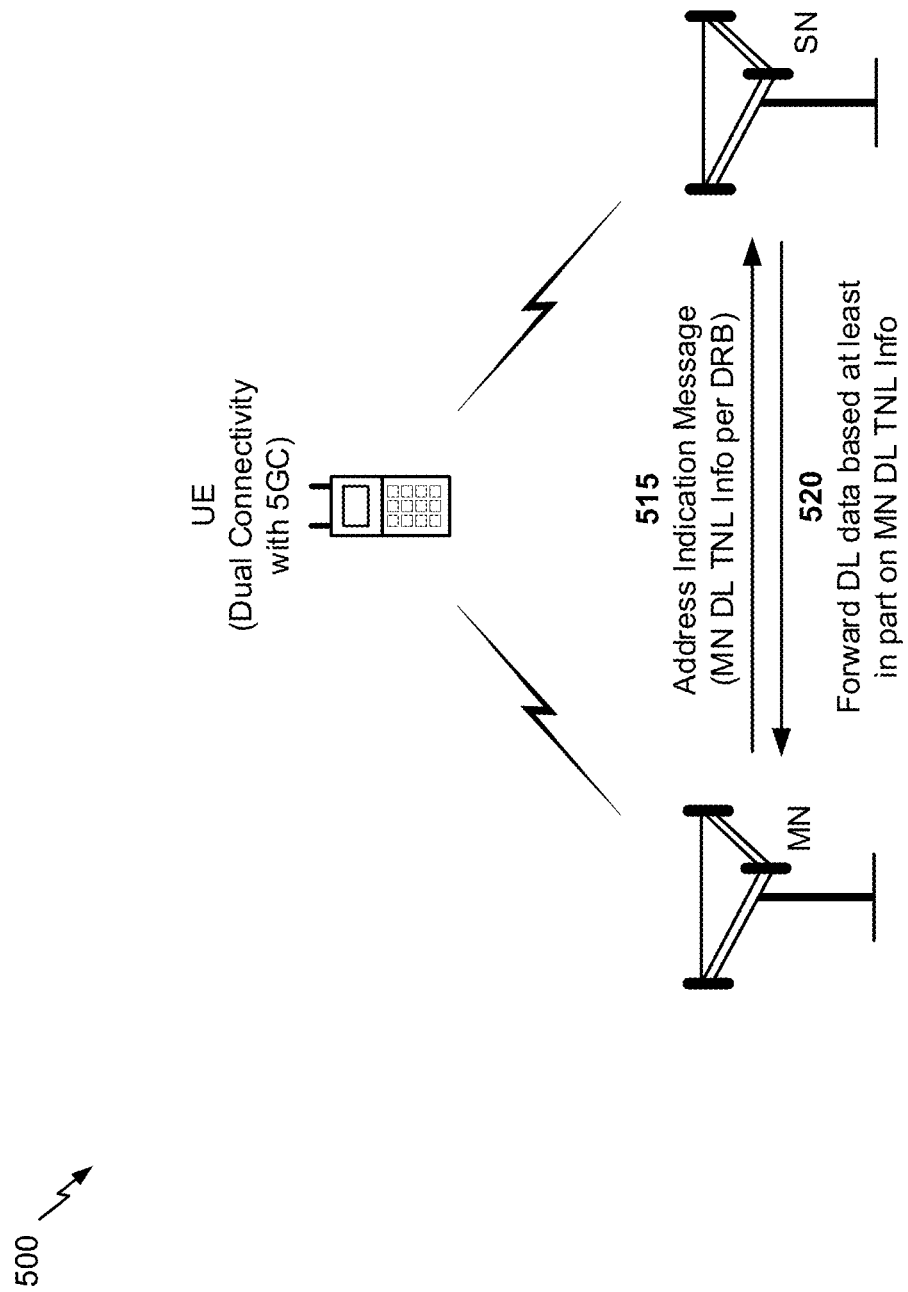

FIGS. 5A and 5B are diagrams illustrating an example 500 of MN NL information exchange for downlink data forwarding of an SN terminated bearer. As indicated in FIG. 5A, an MN (e.g., a first base station 110) and an SN (e.g., a second base station 110) may be capable of providing, to a user equipment (e.g., UE 120), dual connectivity with a core network (e.g., a 5G core network). While the MN and the SN will be described as base stations 110, in some aspects, the MN and/or the SN may be implemented as a UE 120 or another device associated with the 5G core network.

In some aspects, the dual connectivity with the 5G core network may be multi-RAT dual connectivity (MR-DC), such as NextGen RAN E-UTRA-NR dual connectivity (NGEN-DC), NR-E-UTRA dual connectivity (NE-DC), and/or the like. In such a case, the dual connectivity with the 5G core network may be provided by an NR radio access network and an LTE radio access network. In some aspects, the MN may be associated with the NR radio access network (e.g., the MN may be a gNB) and the SN may be associated with the LTE radio access network (e.g., the SN may be an eNB). Alternatively, in some aspects, the MN may be associated with the LTE radio access network (e.g., the MN may be an eNB) and the SN may be associated with the NR radio access network (e.g., the SN may be a gNB).

In some aspects, the dual connectivity with the 5G core network may be NR-NR dual connectivity (NR-NR DC). In such a case the dual connectivity with the 5G core network may be provided by a first NR radio access network and a second NR radio access network. Thus, in some aspects the MN may be associated with one NR radio access network, and the SN may be associated with another NR radio access network.

As shown by reference number 505, the MN may provide an SN request message to the SN. In some aspects, the SN request message may be an SN addition request associated with initiating an SN addition preparation procedure (e.g., an MN-initiated procedure associated with adding an SN in order to provide the UE dual connectivity with the 5G core network). In some aspects, the SN request message may be an SN modification request associated with modifying the SN (e.g., an MN-initiated procedure associated with modifying an SN in association with providing the UE dual connectivity with the 5G core network).

As further shown in FIG. 5A, and by reference number 510, the SN may receive the SN request message, and may provide an acknowledgment message (e.g., an SN addition request acknowledgment, an SN modification request acknowledgment). In some aspects, the acknowledgment message may include information regarding modified QoS flow to DRB mapping and information regarding a need for MCG resources for one or more SN terminated DRBs requiring MCG resources (e.g., information indicating a need for MCG resources for DRBs configured as split bearers or MCG bearers), as described above. As further shown in FIG. 5A, the MN may receive the SN acknowledgment message.

As shown in FIG. 5B, and by reference number 515, the MN may, based at least in part on receiving the acknowledgement message, provide an address indication message (e.g., an Xn-U address indication, a confirmation message, such as an SN addition confirmation message, an SN modification confirmation message, and/or the like). As shown, the address indication message may include MN downlink TNL information for the one or more SN terminated DRBs that requires MCG resources (e.g., one or more MCG bearers and/or one or more split bearers). In some aspects, the MN downlink TNL information may include, for example, a transport layer address associated with the MCG resources to be used for a given SN terminated DRB, a tunnel endpoint identifier associated with the MCG resources to be used for the given SN terminated DRB (e.g., a GPRS tunneling protocol (GTP) tunnel endpoint identifier), and/or the like.

In some aspects, the address indication message may be provided in a first message that immediately follows the acknowledgment. In other words, the MN may provide the address indication message immediately after the MN receives the acknowledgement message (i.e., before the MN provides another message). Thus, in some aspects, the MN may provide the address indication message as a next message provided after receiving the acknowledgment request and/or before the MN provides an RRC reconfiguration message, associated with the SN addition or modification procedure, to the UE.

In some aspects, the address indication message may be included in a unique message (e.g., a message that is not associated with another procedure). In some aspects, the address indication message may be included in another message, such as a message associated with a data forwarding address indication procedure.

In some aspects, a message in which the address indication message is provided, or a message format for the message in which the address indication message is provided, is the same whether the address indication message is associated with an SN addition preparation procedure or an MN initiated SN modification procedure. In other words, when an SN addition procedure or an SN modification procedure is being performed, the address indication message can be the same message (e.g., the third message in the procedure) and can have the same format (regardless of whether the SN preparation addition procedure or the SN modification is being performed).

In some aspects, a message in which the address indication message is provided, or a message format for the message in which the address indication message is provided, may be different depending on the procedure with which the confirmation is associated. In other words, the message and/or the message format may be depend on whether the address indication message is associated with an SN addition preparation procedure, an MN initiated SN modification procedure, or another procedure. Thus, in some aspects, the message in which the address indication message is provided, or the message format of the message in which the address indication message is provided, depends on a procedure associated with the address indication message.

As shown by reference number 520, the SN may receive the address indication message, and may, based at least in part on the MN downlink TNL information, forward downlink data for the SN terminated DRB that requires MCG resources. In some aspects, the SN may receive the address indication message in a first message that immediately follows the acknowledgment message. Thus, in some aspects, the SN may receive the address indication message as a next message received after providing the acknowledgment request and/or before the SN receives an SN reconfiguration complete message from the MN.

In some aspects, the downlink data, forwarded by the SN, may be downlink data that is received from the MN in association with a lossless data transfer. In some aspects, the downlink data, forwarded by the SN, may be downlink data received from the 5G core network.

Figure 5C:
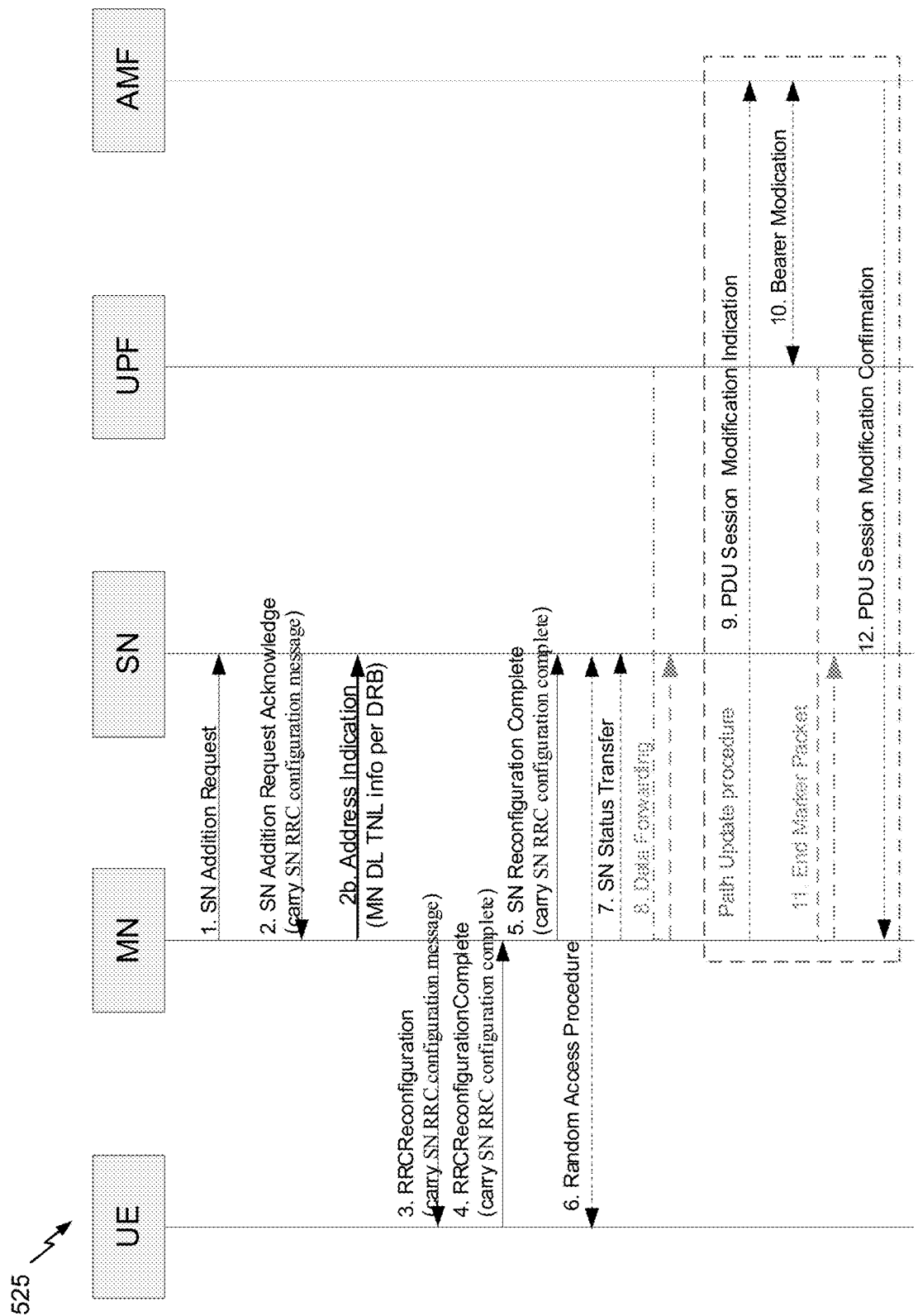

FIG. 5C is a call flow diagram illustrating an example 525 corresponding to the above described process in association with an SN addition procedure.

Figure 5D:
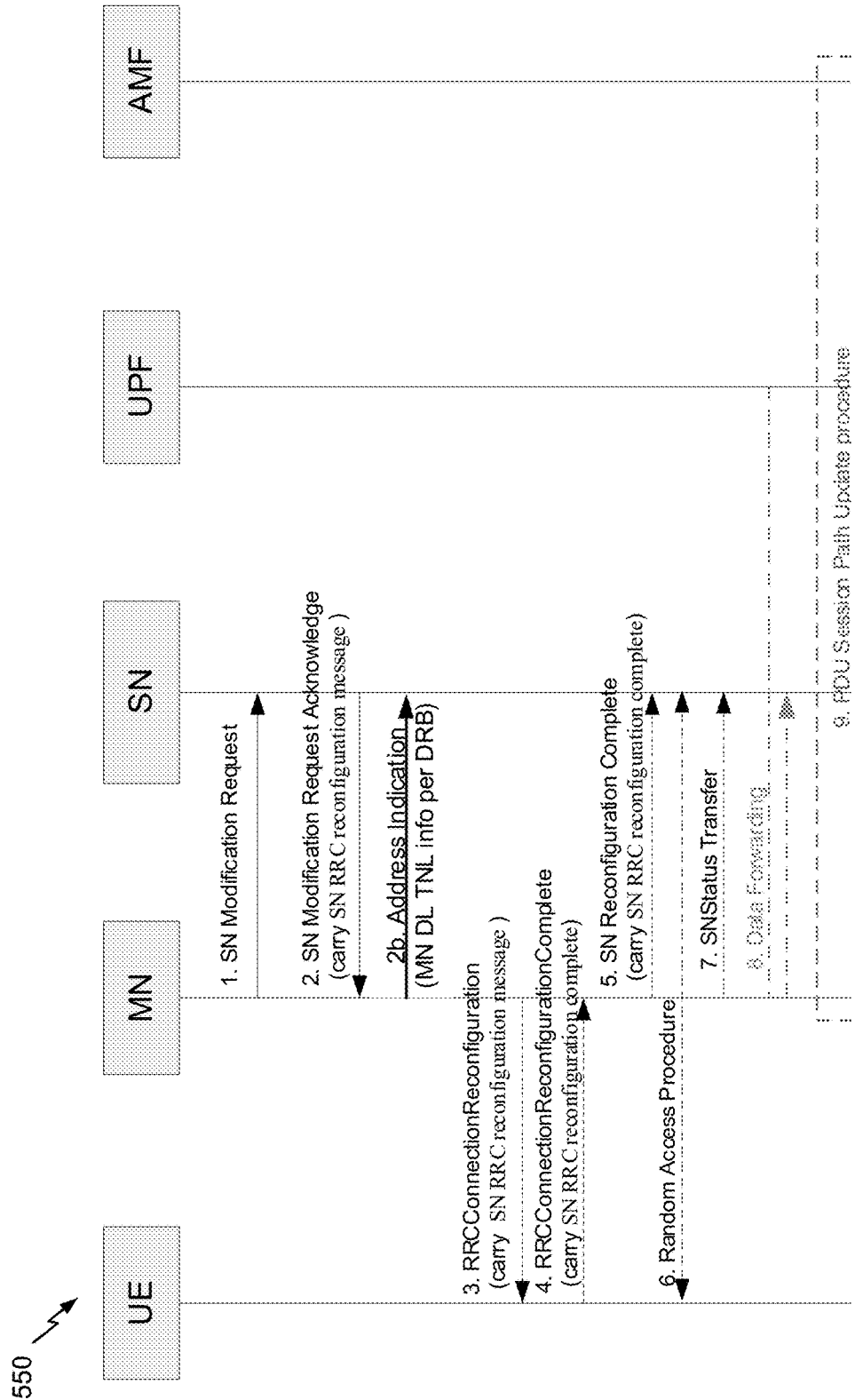

FIG. 5D is a call flow diagram illustrating an example 550 corresponding to the above described process in association with an SN modification procedure.

Notably, in examples 500, 525, and 550, the MN provides the address indication message, including the MN downlink TNL information for the SN terminated DRB, immediately after receiving the acknowledgment request (e.g., in a first message that is provided immediately after receiving the acknowledgement request, as a next message provided after receiving the acknowledgment request, before sending an RRC reconfiguration message to the UE, and/or the like).

Here, by providing the MN downlink TNL information immediately after receiving the acknowledgment request, the SN may begin forwarding downlink data (e.g., downlink data associated with a lossless data transfer, downlink data received from the 5G core network) with minimized delay. Conversely, if the MN were configured to wait to provide the MN downlink TNL information (e.g., in an SN reconfiguration complete message), an undesirable amount of delay, associated with forwarding the downlink data, may occur.

As indicated above, FIGS. 5A-5D are provided as examples. Other examples may differ from what is described with respect to FIGS. 5A-5D.

FIG. 6 is a diagram illustrating an example process 600 performed, for example, by a base station, in accordance with various aspects of the present disclosure. Example process 600 is an example where an MN (e.g., base station 110) performs operations associated with MN TNL information exchange for downlink data forwarding of an SN terminated DRB, as described herein.

As shown in FIG. 6, in some aspects, process 600 may include receiving an acknowledgment message from an SN, wherein the MN and the SN are to provide dual connectivity with a core network for a user equipment (block 610). For example, the MN (e.g., using antenna 234, demodulator 232, MIMO detector 236 receive processor 238, controller/processor 240, and/or the like) may receive an acknowledgment message from an SN (e.g., another base station 110), wherein the MN and the SN are to provide dual connectivity with a core network for a UE 120, as described above.

As shown in FIG. 6, in some aspects, process 600 may include providing an address indication message to the SN based at least in part on receiving the acknowledgment message, wherein the address indication message includes MN downlink TNL information for an SN terminated DRB that requires MCG resources (block 620). For example, the MN (e.g., using antenna 234, modulator 232, TX MIMO processor 230, transmit processor 220, controller/processor, and/or the like) may provide an address indication message to the SN based at least in part on receiving the acknowledgment message, wherein the address indication message includes MN downlink TNL information for an SN terminated DRB that requires MCG resources, as described above. In some aspects, the address indication message is provided in a first message that immediately follows the acknowledgment message.

Process 600 may include additional aspects, such as any single aspect or any combination of aspects described below and/or in connection with one or more other processes described elsewhere herein.

In a first aspect, the acknowledgment message is received in association with an SN addition preparation procedure.

In a second aspect, alone or in combination with the first aspect, the acknowledgment message is received in association with an MN initiated SN modification procedure.

In a third aspect, alone or in combination with any one or more of the first and second aspects, the address indication message is provided before the MN provides an RRC reconfiguration message to the user equipment.

In a fourth aspect, alone or in combination with any one or more of the first through third aspects, the SN terminated DRB that requires MCG resources is an MCG bearer. In some aspects, the SN terminated DRB that requires MCG resources is a split bearer.

In a fifth aspect, alone or in combination with any one or more of the first through fourth aspects, the dual connectivity with the core network is associated with a New Radio (NR) radio access network and a long term evolution (LTE) radio access network.

In a sixth aspect, alone or in combination with any one or more of the first through fifth aspects, the MN is associated with the NR radio access network and the SN is associated with the LTE radio access network.

In a seventh aspect, alone or in combination with any one or more of the first through sixth aspects, the MN is associated with the LTE radio access network and the SN is associated with the NR radio access network.

In an eighth aspect, alone or in combination with any one or more of the first through seventh aspects, the dual connectivity with the core network is associated with a first New Radio (NR) radio access network and a second NR radio access network.

In a ninth aspect, alone or in combination with any one or more of the first through eighth aspects, a message in which the address indication message is provided, or a message format for the message in which the address indication message is provided, is the same whether the address indication message is associated with an SN addition preparation procedure or an MN initiated SN modification procedure.

In a tenth aspect, alone or in combination with any one or more of the first through ninth aspects, a message in which the address indication message is provided, or a message format of the message in which the address indication message is provided, depends on a procedure associated with the address indication message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
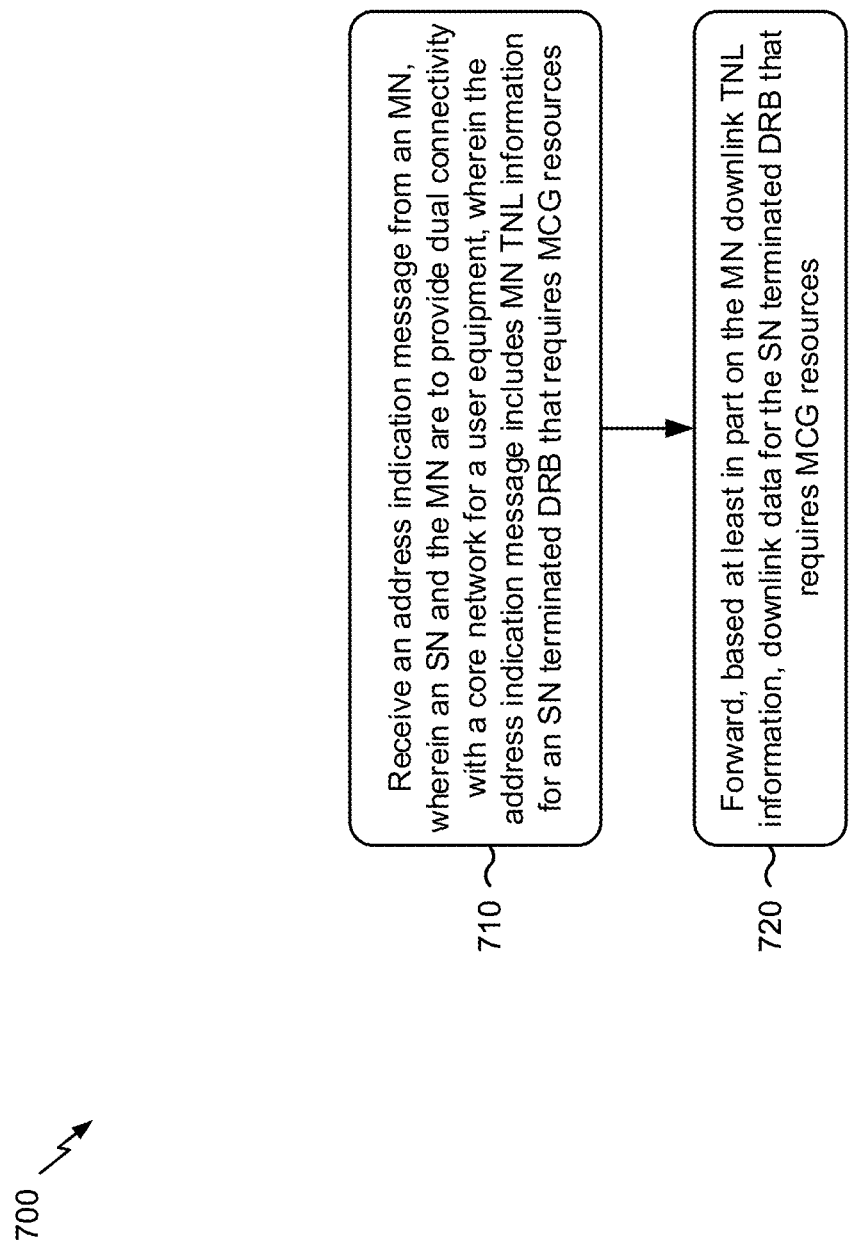
FIG. 7 is a diagram illustrating an example process performed, for example, by a secondary node, in accordance with various aspects of the present disclosure.

FIG. 7 is a diagram illustrating an example process 700 performed, for example, by a base station, in accordance with various aspects of the present disclosure. Example process 700 is an example where an SN (e.g., base station 110) performs operations associated with MN TNL information exchange for downlink data forwarding of an SN terminated DRB, as described herein.

As shown in FIG. 7, in some aspects, process 700 may include receiving an address indication message from an MN, wherein the SN and the MN are to provide dual connectivity with a core network for a user equipment, wherein the address indication message includes MN downlink TNL information for an SN terminated DRB that requires MCG resources (block 710). For example, the SN (e.g., using antenna 234, demodulator 232, MIMO detector 236 receive processor 238, controller/processor 240, and/or the like) may receive an address indication message from an MN (e.g., another base station 110), wherein the SN and the MN are to provide dual connectivity with a core network for a UE 120, wherein the address indication message includes MN downlink TNL information for an SN terminated DRB that requires MCG resources, as described above. In some aspects, the address indication message is received in a first message that immediately follows an acknowledgment message.

As shown in FIG. 7, in some aspects, process 700 may include forwarding, based at least in part on the MN downlink TNL information, downlink data for the SN terminated DRB that requires MCG resources (block 720). For example, the SN (e.g., using antenna 234, modulator 232, TX MIMO processor 230, transmit processor 220, controller/processor, and/or the like) may forward, based at least in part on the MN downlink TNL information, downlink data for the SN terminated DRB that requires MCG resources, as described above.

Process 700 may include additional aspects, such as any single aspect or any combination of aspects described below and/or in connection with one or more other processes described elsewhere herein.

In a first aspect, the address indication message is received in association with an SN addition preparation procedure.

In a second aspect, alone or in combination with the first aspect, the address indication message is received in association with an MN initiated SN modification procedure.

In a third aspect, alone or in combination with any one or more of the first and second aspects, the address indication message is received before an SN reconfiguration complete message is received.

In a fourth aspect, alone or in combination with any one or more of the first through third aspects, the SN terminated DRB that requires MCG resources is an MCG bearer.

In a fifth aspect, alone or in combination with any one or more of the first through fourth aspects, the SN terminated DRB that requires MCG resources is a split bearer.

In a sixth aspect, alone or in combination with any one or more of the first through fifth aspects, the dual connectivity with the core network is associated with a New Radio (NR) radio access network and a long term evolution (LTE) radio access network.

In a seventh aspect, alone or in combination with any one or more of the first through sixth aspects, the MN is associated with the NR radio access network and the SN is associated with the LTE radio access network.

In an eighth aspect, alone or in combination with any one or more of the first through seventh aspects, the MN is associated with the LTE radio access network and the SN is associated with the NR radio access network.

In a ninth aspect, alone or in combination with any one or more of the first through eighth aspects, the dual connectivity with the core network is associated with a first New Radio (NR) radio access network and a second NR radio access network.

In a tenth aspect, alone or in combination with any one or more of the first through ninth aspects, the downlink data is received from the MN in association with a lossless data transfer.

In an eleventh aspect, alone or in combination with any one or more of the first through tenth aspects, the downlink data is data received from the core network.

In a twelfth aspect, alone or in combination with any one or more of the first through eleventh aspects, a message in which the address indication message is received, or a message format for the message in which the address indication message is received, is the same whether the address indication message is associated with an SN addition preparation procedure or an MN initiated SN modification procedure.

In a thirteenth aspect, alone or in combination with any one or more of the first through twelfth aspects, a message in which the address indication message is received, or a message format of the message in which the address indication message is received, depends on a procedure associated with the address indication message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a master node (MN), comprising:
   receiving an acknowledgment message from a secondary node (SN), wherein the MN and the SN are to provide dual connectivity with a core network for a user equipment; and
   providing an address indication message to the SN based at least in part on receiving the acknowledgment message, wherein the address indication message is provided in a first message that immediately follows the acknowledgment message and that is before the MN provides a first radio resource control (RRC) reconfiguration message, wherein the address indication message includes MN downlink transport network layer (TNL) information for an SN terminated data radio bearer (DRB) that requires master cell group (MCG) resources, and wherein a message format of the first message is different when the address indication message is associated with an SN addition preparation procedure than when the address indication is associated with an MN initiated SN modification procedure.

2. The method of claim 1, wherein the acknowledgment message is received in association with the SN addition preparation procedure, or wherein the acknowledgment message is received in association with the MN initiated SN modification procedure.

3. The method of claim 1, wherein the MN provides the RRC reconfiguration message to the user equipment.

4. The method of claim 1, wherein the SN terminated DRB that requires MCG resources is an MCG bearer, or wherein the SN terminated DRB that requires MCG resources is a split bearer.

5. The method of claim 1, wherein the dual connectivity with the core network is associated with a New Radio (NR) radio access network and a long term evolution (LTE) radio access network.

6. The method of claim 5, wherein the MN is associated with the NR radio access network and the SN is associated with the LTE radio access network.

7. The method of claim 5, wherein the MN is associated with the LTE radio access network and the SN is associated with the NR radio access network.

8. The method of claim 1, wherein the dual connectivity with the core network is associated with a first New Radio (NR) radio access network and a second NR radio access network.

9. A method of wireless communication performed by a secondary node (SN), comprising:
   receiving an address indication message from a master node (MN), wherein the SN and the MN are to provide dual connectivity with a core network for a user equipment, wherein the address indication message is received in a first message that immediately follows an acknowledgment message and that is before the MN provides a first radio resource control (RRC) reconfiguration message, wherein the address indication message includes MN downlink transport network layer (TNL) information for an SN terminated data radio bearer (DRB) that requires master cell group (MCG) resources, and wherein a message format of the first message is different when the address indication message is associated with an SN addition preparation procedure than when the address indication is associated with an MN initiated SN modification procedure; and
   forwarding, based at least in part on the MN downlink TNL information, downlink data for the SN terminated DRB that requires MCG resources.

10. The method of claim 9, wherein the address indication message is received in association with the SN addition preparation procedure.

11. The method of claim 9, wherein the address indication message is received in association with the MN initiated SN modification procedure.

12. The method of claim 9 wherein the address indication message is received before an SN reconfiguration complete message is received.

13. The method of claim 9, wherein the SN terminated DRB that requires MCG resources is an MCG bearer.

14. The method of claim 9, wherein the SN terminated DRB that requires MCG resources is a split bearer.

15. The method of claim 9, wherein the dual connectivity with the core network is associated with a New Radio (NR) radio access network and a long term evolution (LTE) radio access network.

16. The method of claim 15, wherein the MN is associated with the NR radio access network and the SN is associated with the LTE radio access network.

17. The method of claim 15, wherein the MN is associated with the LTE radio access network and the SN is associated with the NR radio access network.

18. The method of claim 9, wherein the dual connectivity with the core network is associated with a first New Radio (NR) radio access network and a second NR radio access network.

19. The method of claim 9, wherein the downlink data is received from the MN in association with a lossless data transfer.

20. The method of claim 9, wherein the downlink data is data received from the core network.

21. A master node (MN) for wireless communication, comprising:
   a memory; and
   one or more processors operatively coupled to the memory, the memory and the one or more processors configured to:

receive an acknowledgment message from a secondary node (SN), wherein the MN and the SN are to provide dual connectivity with a core network for a user equipment; and provide an address indication message to the SN based at least in part on receiving the acknowledgment message, wherein the address indication message is provided in a first message that immediately follows the acknowledgment message and that is before the MN provides a first radio resource control (RRC) reconfiguration message, wherein the address indication message includes MN downlink transport network layer (TNL) information for an SN terminated data radio bearer (DRB) that requires master cell group (MCG) resources, and wherein a message format of the first message is different when the address indication message is associated with an SN addition preparation procedure than when the address indication is associated with an MN initiated SN modification procedure.

22. A secondary node (SN) for wireless communication, comprising:
a memory; and
one or more processors operatively coupled to the memory, the memory and the one or more processors configured to:
receive an address indication message from a master node (MN), wherein the SN and the MN are to provide dual connectivity with a core network for a user equipment, wherein the address indication message is received in a first message that immediately follows an acknowledgment message and that before the MN provides a first radio resource control (RRC) reconfiguration message, wherein the address indication message includes MN downlink transport network layer (TNL) information for an SN terminated data radio bearer (DRB) that requires master cell group (MCG) resources, and wherein a message format of the first message is different when the address indication message is associated with an SN addition preparation procedure than when the address indication is associated with an MN initiated SN modification procedure; and forward, based at least in part on the MN downlink TNL information, downlink data for the SN terminated DRB that requires MCG resources.

23. The MN of claim 21, wherein the acknowledgment message is received in association with the SN addition preparation procedure, or wherein the acknowledgment message is received in association with the MN initiated SN modification procedure.

24. The MN of claim 21, wherein the MN provides the RRC reconfiguration message to the user equipment.

25. The MN of claim 21, wherein the SN terminated DRB that requires MCG resources is an MCG bearer, or wherein the SN terminated DRB that requires MCG resources is a split bearer.

26. The MN of claim 21, wherein the SN terminated DRB that requires MCG resources is an MCG bearer, or wherein the SN terminated DRB that requires MCG resources is a split bearer.

27. The SN of claim 22, wherein the acknowledgment message is received in association with the SN addition preparation procedure, or wherein the acknowledgment message is received in association with the MN initiated SN modification procedure.

28. The SN of claim 22, wherein the MN provides the RRC reconfiguration message to the user equipment.

29. The SN of claim 22, wherein the SN terminated DRB that requires MCG resources is an MCG bearer, or wherein the SN terminated DRB that requires MCG resources is a split bearer.

30. The SN of claim 22, wherein the SN terminated DRB that requires MCG resources is an MCG bearer, or wherein the SN terminated DRB that requires MCG resources is a split bearer.

* * * * *